(12) United States Patent
Bales et al.

(10) Patent No.: US 10,808,550 B2
(45) Date of Patent: Oct. 20, 2020

(54) FAN BLADE WITH INTEGRAL METERING DEVICE FOR CONTROLLING GAS PRESSURE WITHIN THE FAN BLADE

(71) Applicant: United Technologies Corporation, Farmington, CT (US)

(72) Inventors: Daniel A. Bales, Avon, CT (US); Michael A. Weisse, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 74 days.

(21) Appl. No.: 16/219,191

(22) Filed: Dec. 13, 2018

(65) Prior Publication Data

US 2020/0190992 A1 Jun. 18, 2020

(51) Int. Cl.

| | |
|---|---|
| *F01D 5/14* | (2006.01) |
| *F01D 5/18* | (2006.01) |
| *F16K 15/04* | (2006.01) |
| *F01D 5/28* | (2006.01) |

(52) U.S. Cl.
CPC ............. *F01D 5/187* (2013.01); *F01D 5/147* (2013.01); *F01D 5/28* (2013.01); *F16K 15/044* (2013.01); *F05D 2230/232* (2013.01); *F05D 2260/201* (2013.01)

(58) Field of Classification Search
CPC .... F01D 5/147; F01D 5/148; Y10T 29/49412; B23P 15/04
See application file for complete search history.

(56) References Cited

U.S. PATENT DOCUMENTS

| | | | | |
|---|---|---|---|---|
| 2,725,076 A | * | 11/1955 | Hansen | F16K 15/063 137/543.15 |
| 3,750,983 A | * | 8/1973 | Morris | B64D 27/18 244/54 |
| 3,918,837 A | * | 11/1975 | Poucher | F01D 7/00 416/157 R |
| 4,084,609 A | * | 4/1978 | Johnson | F16K 17/06 137/327 |
| 5,240,376 A | * | 8/1993 | Velicki | B21D 26/055 228/157 |
| 5,706,651 A | * | 1/1998 | Lillibridge | B64D 33/06 181/220 |
| 5,946,802 A | * | 9/1999 | Calle | B21D 26/027 29/889.72 |

(Continued)

FOREIGN PATENT DOCUMENTS

| | | |
|---|---|---|
| FR | 2967646 A1 | 5/2012 |
| GB | 2397855 A | 1/2003 |

OTHER PUBLICATIONS

Extended European Search Report; Application No. 19214986.2; dated May 14, 2020; 6 pages.

*Primary Examiner* — Moshe Wilensky
*Assistant Examiner* — Brian Christopher Delrue
(74) *Attorney, Agent, or Firm* — Cantor Colburn LLP

(57) ABSTRACT

Disclosed is a fan blade for a gas turbine engine, including: an airfoil, a cavity formed in the airfoil, a cover configured to cover the cavity, the cover when secured to the airfoil encloses the cavity in the airfoil, a conduit extending from the cavity to an exterior surface of the fan blade, and a check valve located in the conduit, the check valve configured to regulate an internal pressure of the cavity when the cover is secured to the airfoil.

20 Claims, 5 Drawing Sheets

(56) References Cited

U.S. PATENT DOCUMENTS

| | | | |
|---|---|---|---|
| 6,485,255 B1 | 11/2002 | Care et al. | |
| 2004/0151585 A1* | 8/2004 | Jones | F01D 5/16 |
| | | | 416/90 R |
| 2007/0219480 A1* | 9/2007 | Kamen | F04B 43/02 |
| | | | 604/20 |
| 2008/0292899 A1* | 11/2008 | Tanimoto | B21B 3/00 |
| | | | 428/593 |
| 2009/0014679 A1* | 1/2009 | Hygema | B65D 83/565 |
| | | | 251/368 |
| 2009/0184185 A1* | 7/2009 | Lewis | F02M 61/168 |
| | | | 239/585.5 |
| 2010/0062100 A1* | 3/2010 | Hahn | B29C 45/23 |
| | | | 425/564 |
| 2011/0309284 A1* | 12/2011 | Yamada | F16K 1/42 |
| | | | 251/324 |
| 2014/0083080 A1* | 3/2014 | Hansen | F01D 25/007 |
| | | | 60/226.1 |
| 2016/0305252 A1 | 10/2016 | Thornton et al. | |
| 2019/0338673 A1* | 11/2019 | Edwards | F01M 11/12 |
| 2020/0011183 A1* | 1/2020 | Behr | F01D 21/08 |
| 2020/0109795 A1* | 4/2020 | Murray | F02C 9/18 |

\* cited by examiner

FAN BLADE WITH INTEGRAL METERING DEVICE FOR CONTROLLING GAS PRESSURE WITHIN THE FAN BLADE

BACKGROUND

Exemplary embodiments pertain to the art of hollow fan blades and more specifically to a fan blade and method for controlling gas pressure within the fan blade.

Hollow fan blades may include an airfoil, which may be a machined three-dimensional forged structure having a generally curved exterior contour. The airfoil may have an internal cavity with structural support ribs. A cover, which may be a hot formed titanium cover, may be welded onto the airfoil to enclose the cavity. The welding may occur either by electron beam welding or by laser welding. As compared with electron beam welding, laser welding of the airfoil and cover may result in an improved fatigue capability. For a titanium fan blade, laser welding may be performed in an argon environment.

During laser welding of a titanium fan blade, argon gas may become trapped within the cavity. Subsequent to the laser welding process, the fan blade may be exposed to stress relief and/or creep forming operations. Such post-welding processing may be typically performed at relatively high temperatures, such as between thirteen hundred (1300) to sixteen hundred (1600) degrees Fahrenheit (F). The argon gas trapped within the cavity may expand, producing surface deformations, such as bulging, in the fan blade. Accordingly, it is desirable to allow a portion of the trapped argon gas to escape from the fan blade during post-welding processing of the fan blade.

BRIEF DESCRIPTION

Disclosed is a fan blade for a gas turbine engine, comprising: an airfoil, a cavity formed in the airfoil, a cover configured to cover the cavity, the cover when secured to the airfoil encloses the cavity in the airfoil, a conduit extending from the cavity to an exterior surface of the fan blade, and a check valve located in the conduit, the check valve configured to regulate an internal pressure of the cavity when the cover is secured to the airfoil.

In addition to one or more features disclosed above or as an alternate the check valve is biased to permit a metered flow out of the cavity.

In addition to one or more features disclosed above or as an alternate the check valve includes a spring biased metering element and a valve seat that limits movement of the metering element into the cavity.

In addition to one or more features disclosed above or as an alternate the check valve includes a spring seat that supports a spring for biasing the metering element toward the cavity.

In addition to one or more features disclosed above or as an alternate the check valve includes a base, the base including the spring seat, and the base is fixedly positioned within the conduit.

In addition to one or more features disclosed above or as an alternate the conduit includes a plurality of rings that expand outwardly to securely position the base within the conduit.

In addition to one or more features disclosed above or as an alternate the base extends in the conduit to the valve seat to surround the spring and at least a portion of the metering element.

In addition to one or more features disclosed above or as an alternate the conduit and base are cylindrical.

In addition to one or more features disclosed above or as an alternate the metering element is a ball, or truncated cone or a double-sided truncated cone having a portion that extends into a coiled center of the spring.

In addition to one or more features disclosed above or as an alternate the conduit extends through a blade root portion of the blade structure.

In addition to one or more features disclosed above or as an alternate the fan blade is titanium.

In addition to one or more features disclosed above or as an alternate the fan blade includes: a rib support structure between the cover and the airfoil, wherein the rib support structure includes: a first plurality of ribs that are connected by welds to the cover and include a respectively plurality of through-holes, a second plurality of ribs, wherein a plurality of gaps are formed between the second plurality of ribs and the cover.

In addition to one or more features disclosed above or as an alternate the first plurality of ribs are cylindrical.

In addition to one or more features disclosed above or as an alternate the second plurality of ribs are linear and interconnect the first plurality of ribs.

Further disclosed is a gas turbine engine comprising: a fan blade, the fan blade including: an airfoil, a cavity formed in the airfoil, a cover configured to cover the cavity, the cover when secured to the airfoil encloses the cavity in the airfoil, a conduit extending from the cavity to an exterior surface of the fan blade, and a check valve located in the conduit, the check valve configured to regulate an internal pressure of the cavity when the cover is secured to the airfoil.

Further disclosed is a method of forming a fan blade for a gas turbine engine, the method comprising: welding a cover to an airfoil, the cover enclosing a cavity in the airfoil; and venting a gas trapped in the cavity after the welding with a check valve positioned in a conduit formed in the fan blade, wherein the conduit is in fluid communication with the cavity.

In addition to one or more features disclosed above or as an alternate a metering element disposed in the conduit is biased to an opened configuration by the venting gas.

In addition to one or more features disclosed above or as an alternate a rib support structure within the cavity between the cover and the airfoil contains one or more through holes through which gas expands while being vented through the check valve.

In addition to one or more features disclosed above or as an alternate the gas is argon and the fan blade is titanium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
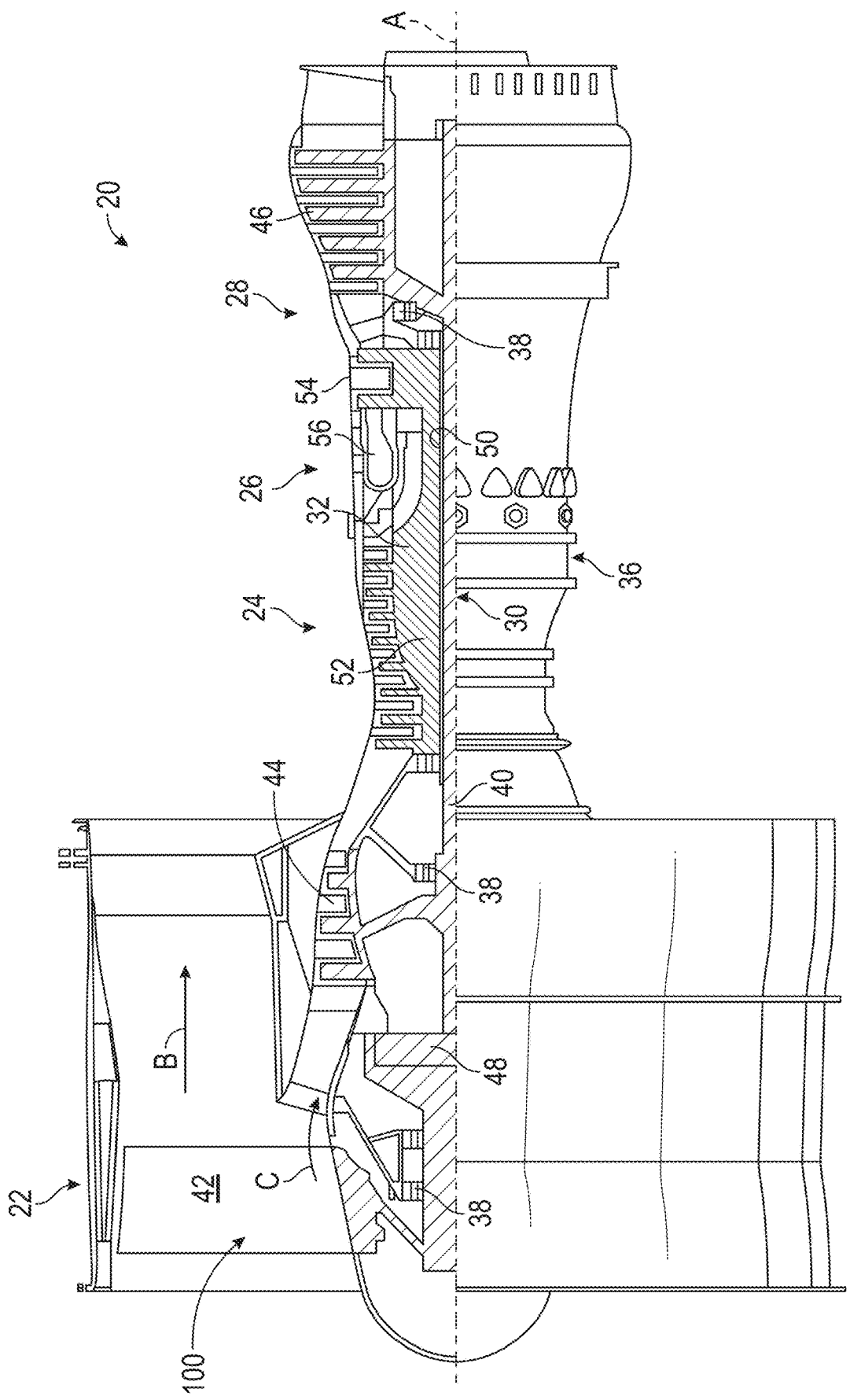
FIG. 1 is a partial cross sectional view of a gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft./sec divided by an industry standard temperature correction of [(Tram ° R)/(518.7° R)]0.5. The "Low corrected fan tip speed" as disclosed herein according to one non-limiting embodiment is less than about 1150 ft./second (350.5 m/sec).

Figure 2:
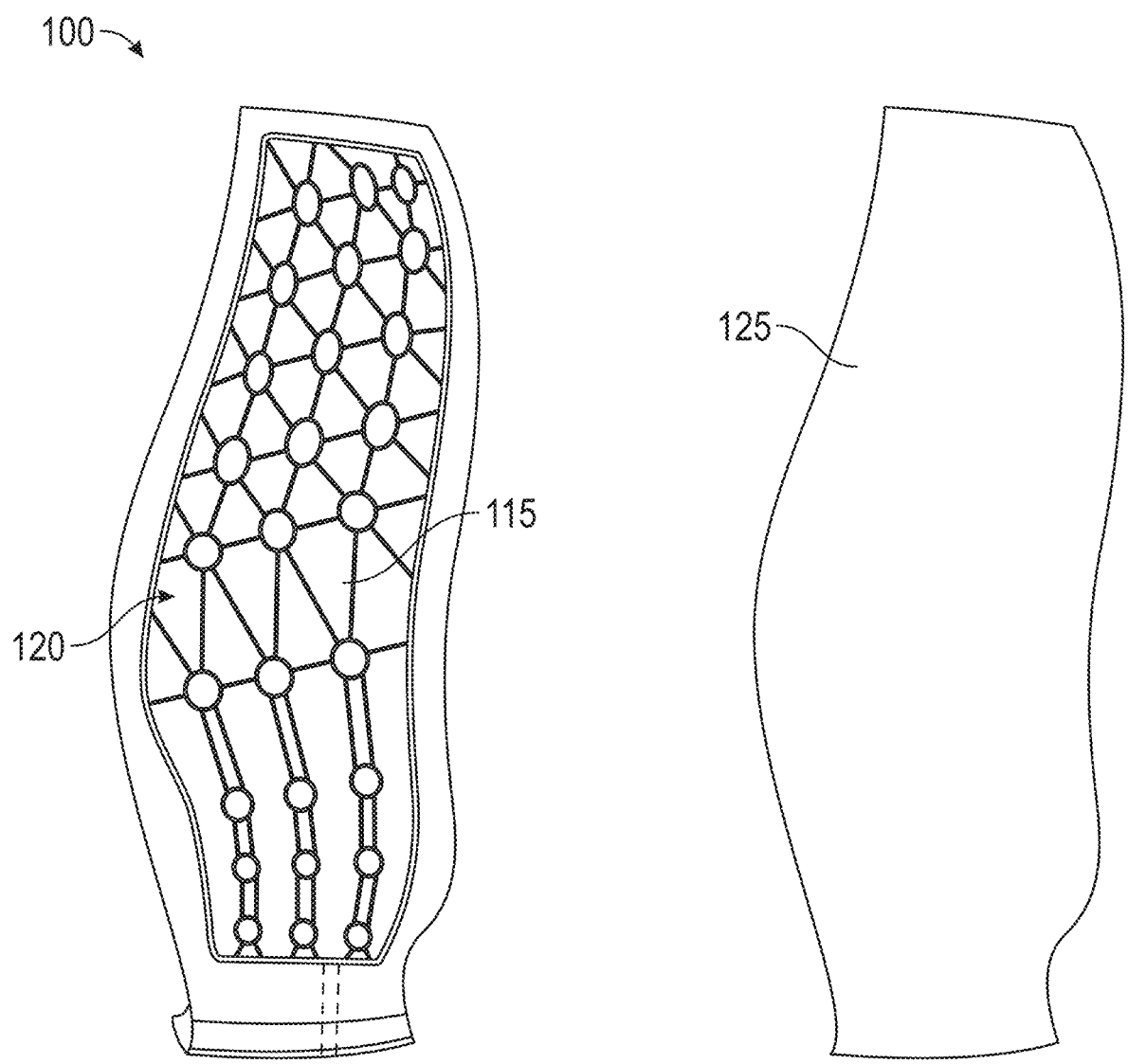
FIG. 2 is an exploded view of an airfoil and cover according to an embodiment illustrating a cavity in the fan blade.
Figure 3:
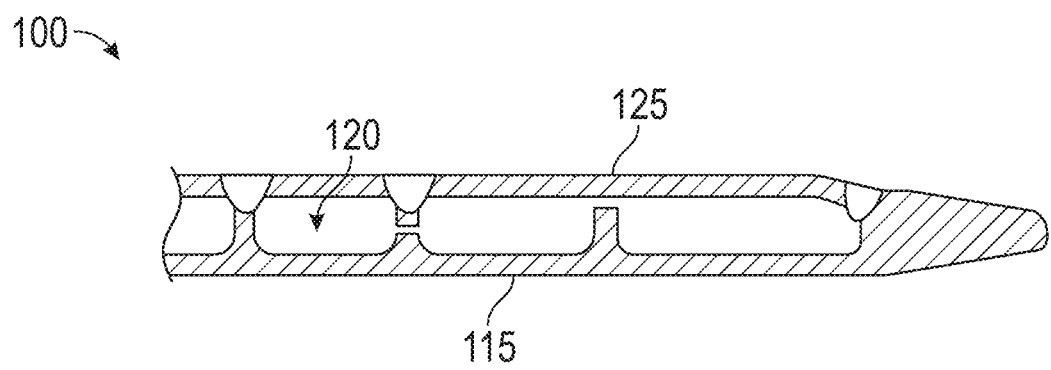
FIG. 3 is a cross sectional view of a portion of a fan blade according to an embodiment illustrating additional features of the cavity.
Figure 4:
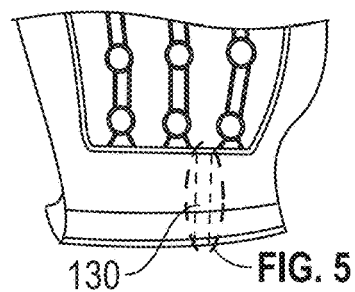
FIG. 4 is a view of a portion of the airfoil of FIG. 2 according to an embodiment illustrating a conduit in the airfoil.
Figure 5:
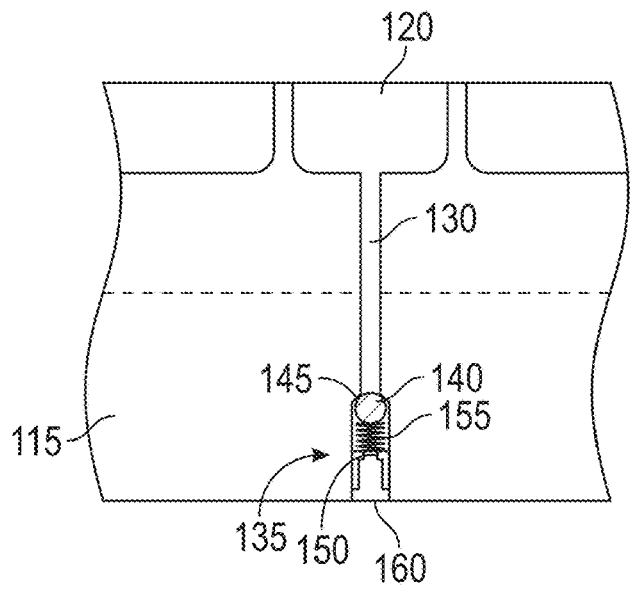
FIG. 5 is cross sectional view of a portion of the airfoil of FIG. 4 according to an embodiment illustrating a check valve in the conduit.

Turning to FIGS. 2 and 3, a fan blade 100 is illustrated. As discussed above the fan blade 100 may be a hollow fan blade for use in the gas turbine engine 20. The fan blade 100 may comprise an airfoil 115. The airfoil 115 may be one of a pressure-side surface and a suction-side surface of the fan blade 100. The airfoil 115 may be contoured to form a cavity 120. The cavity 120 may be covered when the airfoil 115 is mated with a cover 125. Turning to FIGS. 4 and 5, a conduit 130 may be formed through the fan blade 100 to provide fluid communication between the cavity 120 and an exterior of the fan blade 100. The conduit 130 may include a check valve 135, for example a pneumatic check valve. According to an embodiment the check valve 135 may be configured to permit a metered flow of gas out of the cavity 120.

Generally, the fan blade 100 may be titanium. The airfoil 115 may be welded to the cover 125 in an argon environment to form the fan blade 100. This process may trap argon gas within the cavity 120. During a subsequent heating of the fan blade 100, for example during a stress relief process, the trapped argon gas may expand and deform the titanium. The check valve 135 may provide for a relief of pressure within the cavity 120 during expansion of the trapped argon gas, and therefore to minimize potential material deformations.

As illustrated in FIGS. 4 and 5, the check valve 135 may include a spring biased metering element 140. The conduit 130 may include a valve seat 145 for limiting movement of the metering element 140 into the cavity 120. The valve seat 145 may have, for example, a forty-five degree seating angle. The check valve 135 may include a spring seat 150 for supporting a spring 155 for biasing the metering element 140 toward the cavity 120. The check valve 135 may further include a base 160. The base 160 may include the spring seat 150. The base 160 may be fixedly positioned within the conduit 130.

Figure 6:
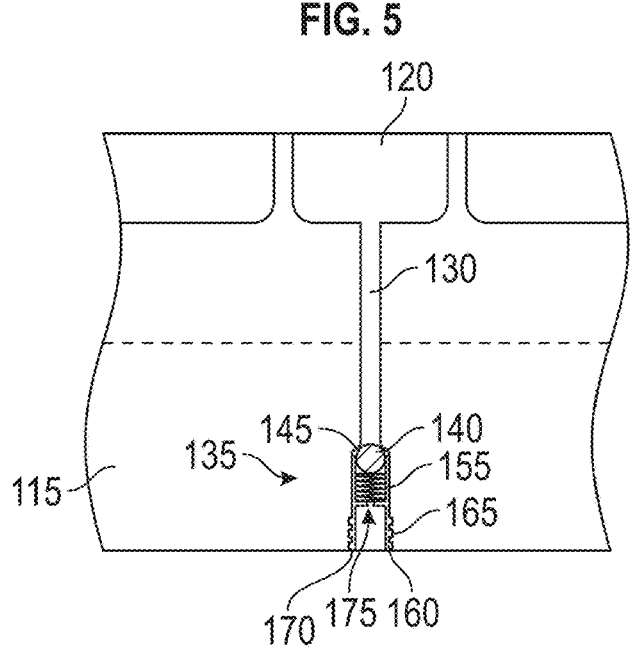
FIG. 6 is another cross sectional view of a portion of the airfoil according to an embodiment illustrating additional features of the check valve.

As illustrated in FIG. 6, the base 160 may be a machined hollow metal retaining device having a series of protruding rings 165 machined onto an outer diameter 170 of the base 160. Upon being expanded internally, for example with a mechanical expanding tool, the rings 165 may mechanically engage the conduit 130 to interlock the base 160 and conduit 130. After being interlocked, removal of the base 160 may be achieved by a subsequent machining operation. The base 160 may support the spring 155 with the spring seat 150 machined therein. A through-hole 175 machined into the base 160 may enable argon gas to escape when the check-valve is biased to an open state.

Figure 7:
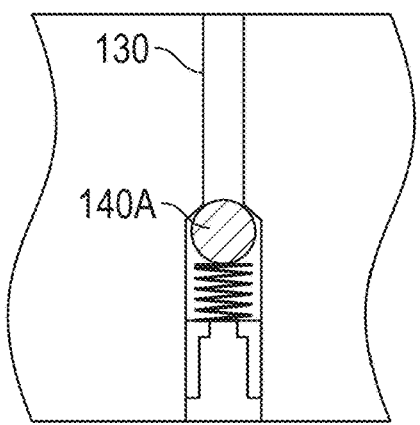
FIG. 7 is another cross sectional view of a portion of the airfoil according to an embodiment illustrating a metering element for the check valve.
Figure 8:
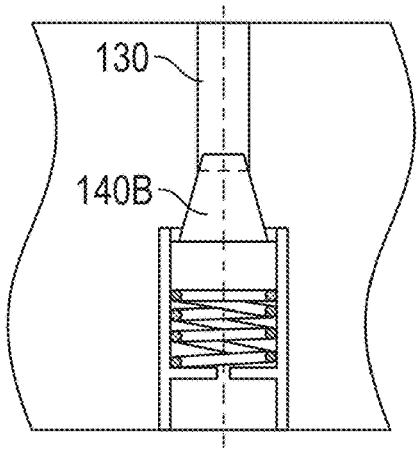
FIG. 8 is another cross sectional view of a portion of the airfoil according to an embodiment illustrating another metering element for the check valve.
Figure 9:
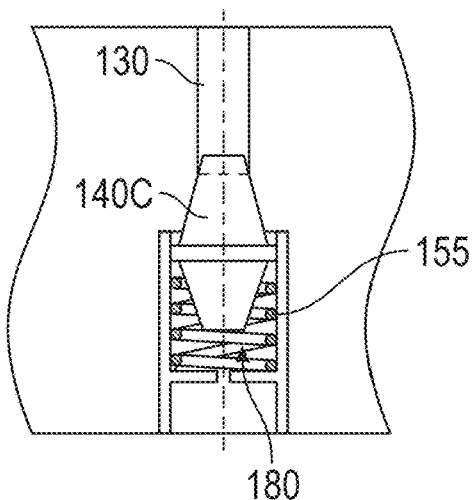
FIG. 9 is another cross sectional view of a portion of the airfoil according to an embodiment illustrating a further metering element for the check valve.
Figure 10:
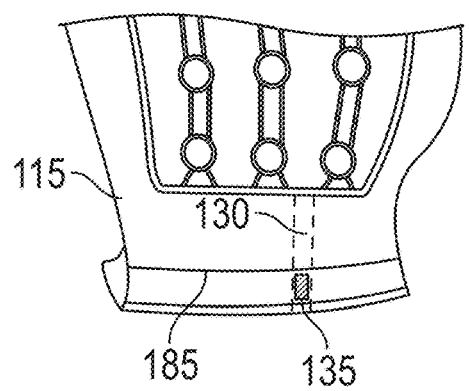
FIG. 10 is another view of the portion of the airfoil of FIG. 2 according to an embodiment illustrating a location in the fan blade for the conduit and check valve.

Turning to FIG. 7, the conduit 130 and base 160 may be cylindrical. As illustrated in FIGS. 7-9 respectively, the metering element 140 may be a ball 140A, a truncated cone 140B or a double-sided truncated cone 140C. The double-sided truncated cone 140C may extend into both the conduit 130 and a coiled center 180 of the spring 155. The double-sided truncated cone 140C prevents said metering element from being misinstalled and may provide an increased level of movement stability compared with a single sided truncated cone 140B or ball 140A. The metering element 140 may be silicon nitride to provide a desired surface smoothness and provide for a desired level of stress handling. As illustrated in FIG. 10, the conduit 130 may extend through a blade root 185 of the fan blade 100. However, other portions of the fan blade 100 supporting a conduit 130 and check valve 135 are within the scope of the embodiments.

Figure 11:
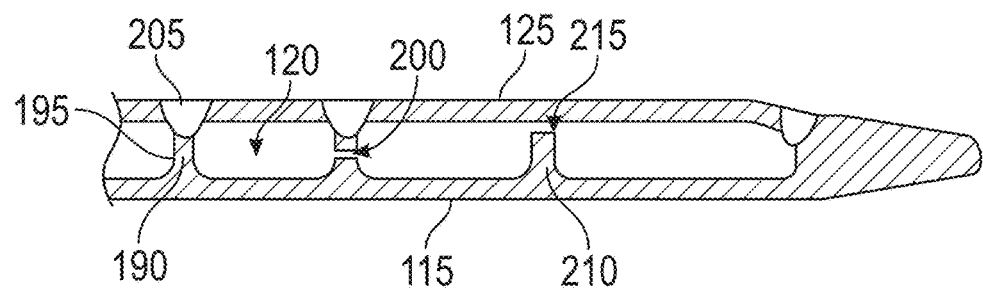
FIG. 11 is another cross sectional view of a portion of a fan blade according to an embodiment illustrating a rib support structure.
Figure 12:
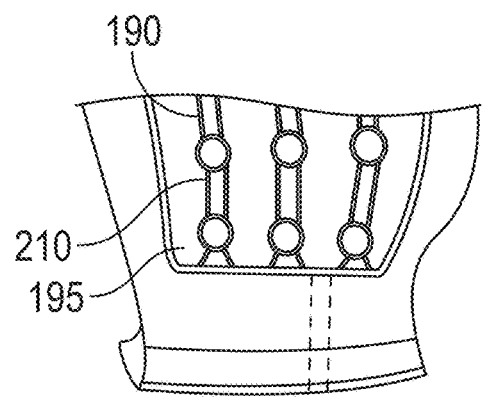
FIG. 12 is another view of the portion of the airfoil of FIG. 2 according to an embodiment illustrating additional features of the rib support structure.

As illustrated in FIG. 11, a rib support structure 190 may reside in the cavity 120 between the airfoil 115 and the cover 125. The rib support structure 190 may include a first plurality of ribs 195 that may include a respective plurality of through-holes 200. The first plurality of ribs 195 may be connected by welds 205 to the cover 125, and the through-holes 200 may allow gas expansion through the first plurality of ribs 195. A second plurality of ribs 210 may be provided which are not welded to the cover 125. A plurality of gaps 215 may be formed between the second plurality of ribs 210 and the cover 125, allowing gas expansion around the second plurality of ribs 215. As illustrated in FIG. 12, the first plurality of ribs 195 may be cylindrical and the second plurality of ribs 210 may be linear and may extend between the first plurality of ribs 195.

The second plurality of ribs 215 may be machined to provide the desired height difference between the first plurality of ribs 195 and the second plurality of ribs 215. In one embodiment the through-holes 200 may be drilled to a neutral axis of the first plurality of ribs 195. As indicated the first plurality of ribs 195 may be welded to support the cover 125, and the cover 125 may have a three-dimensional twisted contour. During a stress relief/creep forming operation, such the through-holes 200 and gaps 215 may permit fluid communication of argon gas otherwise trapped within the titanium fan blade 100. As the volume of internal argon gas increases, for example due to heat induced expansion, the check valve 135 may permit a release of a sufficient amount of argon to prevent bulging of the surface 115, 125 of the blade. Such configuration also enables retaining sufficient argon within the cavity 120 to prevent contamination of the internal machined surfaces of the blade 100.

In one embodiment, upon completion of thermal processing of the blade 100, and prior to engine service, it may be desirable to plug the through-hole 165 at the base 160. Following thermal processing, and during downstream handling, further manufacturing, inspections, or engine services, the through-hole 165 may become filled with cutting fluids, inspection fluids, machining chips, or other debris, which may perhaps damage the check valve 135, and resulting perhaps in such debris entering the blade cavity 120. Plugging the through-hole 165 with RTV (room temperature vulcanization) silicone, light-curing epoxy, or other such sealant may substantially reduce or remove this possibility. During a future repair process, the plug may be removed from the through-hole 165 to provide for additional heat treatment of the blade 100 with use of the same check valve 135 or a replacement check valve.

The above disclosed embodiments may provide an automated welding technique that may be utilized to form the fan blade 100. The result of the disclosed embodiments may be an improved fatigue capability in the blade resulting from a relief of internal argon gas pressure that may otherwise cause deformation and outward bulging of the blade surfaces 115, 125. Additionally, while the check valve 135 may permit a portion of argon to escape in order to prevent bulging, the check valve 135 may also prevent entry of external argon or air into the blade internal cavity 120.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan blade for a gas turbine engine, comprising:
   an airfoil,
   a cavity formed in the airfoil,
   a cover configured to cover the cavity, the cover when secured to the airfoil encloses the cavity in the airfoil,
   a conduit extending from the cavity to an exterior surface of the fan blade, and
   a check valve located in the conduit, the check valve configured to regulate an internal pressure of the cavity when the cover is secured to the airfoil.

2. The fan blade of claim 1, wherein the check valve is biased to permit a metered flow out of the cavity.

3. The fan blade of claim 2, wherein the check valve includes a spring biased metering element and a valve seat that limits movement of the metering element into the cavity.

4. The fan blade of claim 3, wherein the check valve includes a spring seat that supports a spring for biasing the metering element toward the cavity.

5. The fan blade of claim 4, wherein the check valve includes a base, the base including the spring seat, and the base is fixedly positioned within the conduit.

6. The fan blade of claim 5, wherein the conduit includes a plurality of rings that expand outwardly to securely position the base within the conduit.

7. The fan blade of claim 6, wherein the base extends in the conduit to the valve seat to surround the spring and at least a portion of the metering element.

8. The fan blade of claim 7, wherein the conduit and base are cylindrical.

9. The fan blade of claim 4, wherein the metering element is a ball, or truncated cone or a double-sided truncated cone having a portion that extends into a coiled center of the spring.

10. The fan blade of claim 1, wherein the conduit extends through a blade root portion of the blade structure.

11. The fan blade of claim 1, wherein the fan blade is titanium.

12. The fan blade of claim 1, comprising:
    a rib support structure between the cover and the airfoil, wherein the rib support structure includes:
    a first plurality of ribs that are connected by welds to the cover and include a respectively plurality of through-holes,
    a second plurality of ribs, wherein a plurality of gaps are formed between the second plurality of ribs and the cover.

13. The fan blade of claim 12, wherein the first plurality of ribs are cylindrical.

14. The fan blade of claim 13, wherein the second plurality of ribs are linear and interconnect the first plurality of ribs.

15. A gas turbine engine comprising:
    a fan blade, the fan blade including:
      an airfoil,
      a cavity formed in the airfoil,
      a cover configured to cover the cavity, the cover when secured to the airfoil encloses the cavity in the airfoil,
      a conduit extending from the cavity to an exterior surface of the fan blade, and
      a check valve located in the conduit, the check valve configured to regulate an internal pressure of the cavity when the cover is secured to the airfoil.

16. A method of forming a fan blade for a gas turbine engine, the method comprising:
    welding a cover to an airfoil, the cover enclosing a cavity in the airfoil; and
    venting a gas trapped in the cavity after the welding with a check valve positioned in a conduit formed in the fan blade, wherein the conduit is in fluid communication with the cavity.

17. The method of claim 16 wherein a metering element disposed in the conduit is biased to an opened configuration by the venting gas.

18. The method of claim 17 wherein a rib support structure within the cavity between the cover and the airfoil contains one or more through holes through which gas expands while being vented through the check valve.

19. The method of claim 18, wherein the check valve is biased to permit a metered flow out of the cavity.

20. The method of claim 19 wherein the gas is argon and the fan blade is titanium.

* * * * *